Figure 1:
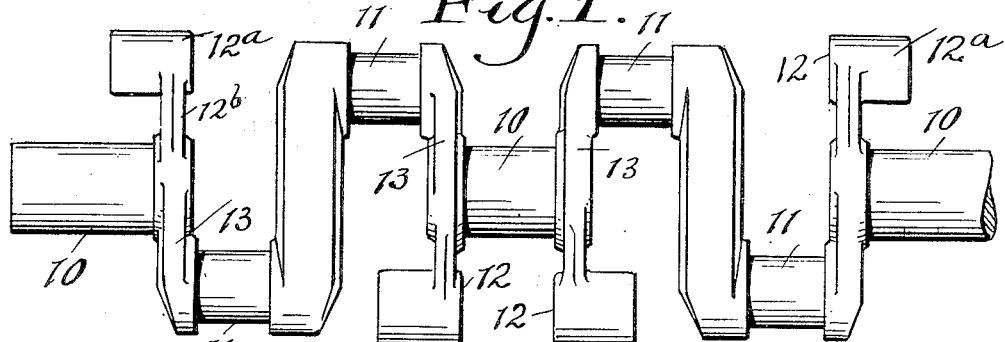

Dec. 11, 1923.

L. W. GREVE 1,476,811

METHOD OF MAKING COUNTERBALANCED CRANK SHAFTS

Filed Oct. 27, 1921   2 Sheets-Sheet 1

Inventor
Louis W. Greve
by Thurston Kwis & Hudson
attys.

Dec. 11, 1923.
L. W. GREVE
1,476,811
METHOD OF MAKING COUNTERBALANCED CRANK SHAFTS
Filed Oct. 27, 1921
2 Sheets-Sheet 2
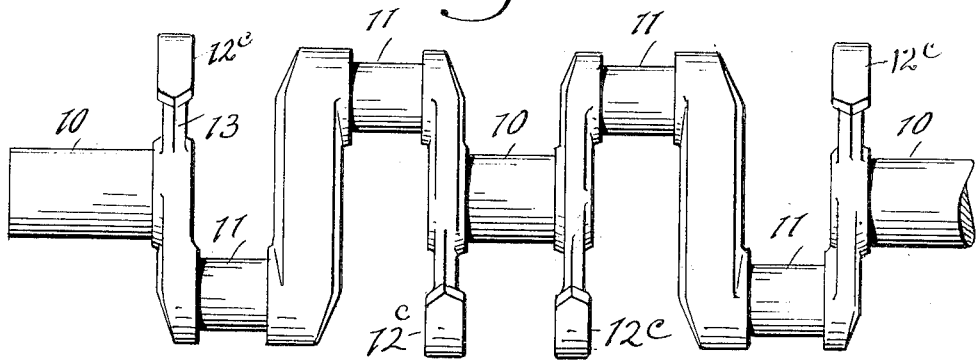
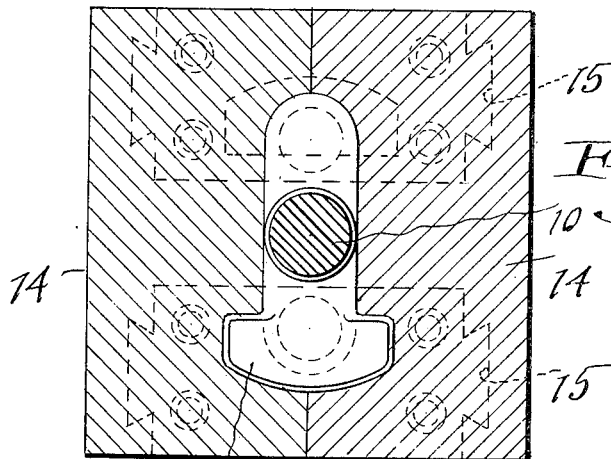
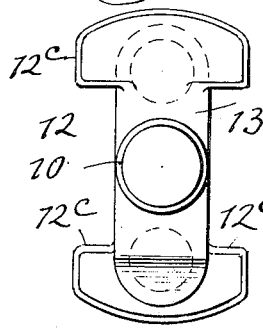
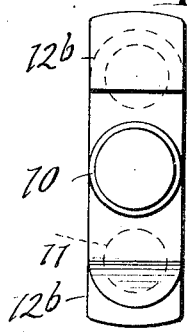

Patented Dec. 11, 1923.

1,476,811

UNITED STATES PATENT OFFICE.

LOUIS W. GREVE, OF CLEVELAND, OHIO, ASSIGNOR TO THE CHAMPION MACHINE & FORGING COMPANY, OF CLEVELAND, OHIO, A CORPORATION OF OHIO.

METHOD OF MAKING COUNTERBALANCED CRANK SHAFTS.

Application filed October 27, 1921. Serial No. 510,933.

*To all whom it may concern:*

Be it known that I, LOUIS W. GREVE, a citizen of the United States, residing at Cleveland, in the county of Cuyahoga and State of Ohio, have invented a certain new and useful Improvement in Methods of Making Counterbalanced Crank Shafts, of which the following is a full, clear, and exact description.

This invention relates to a method of making counterbalanced crank shafts which are commonly employed on high speed engines, particularly internal combustion engines of various kinds of automotive vehicles.

It is customary at the present time to counterbalance the off-center weights of crank shafts by attaching thereto by welding or otherwise, counterweights having arc or sector-shaped outer portions which lie in planes transverse to the axis of the counter shaft diametrically opposite the parts to be counterbalanced. The counterweights are attached to the crank shaft after the latter is forged, for the reason that the shape and location of the counterweights would require forging dies having much deeper depressions than is permissible in forging practice, particularly when forging crank shafts.

As far as I am aware, no method has heretofore been devised whereby counterweighted crank shafts could be forged with the counterweights produced thereon in the forging operation, having in mind the limitations of cost, and the required constructional shape or design of the crank shaft to be produced.

The principal object of the invention is to avoid the necessity of separately applying counterweights to a crank shaft after it has been forged, and to provide a method whereby a crank shaft with integral counterweights shaped and located as required to produce the best results, can be produced with the counterweights formed on the crank shaft in the forging operation.

In accordance with the present invention, the counterweight masses are forged integrally with the crank-shaft but substantially within the confines of the upper and lower surfaces of the crank shaft when forged, and in a subsequent step the counterweight masses are re-formed or re-positioned so that they will extend laterally or transversely of the crank shaft axis and have the shape and position required.

In the preferred embodiment of the present invention, the counterweights or counterweight masses are, following the first forging step wherein the crank shaft is forged, subjected to an upsetting action by suitable dies which causes the metal of the counterweight to be extended laterally, and to assume the final shape and position of the counterweights, thus forming the enlarged sector-shaped counterweight portions lying in planes transverse to the axis of the crank shaft.

The invention may be further briefly summarized as consisting in certain novel steps of the improved method which will be described in the specification and pointed out in the appended claims.

Figure 2:
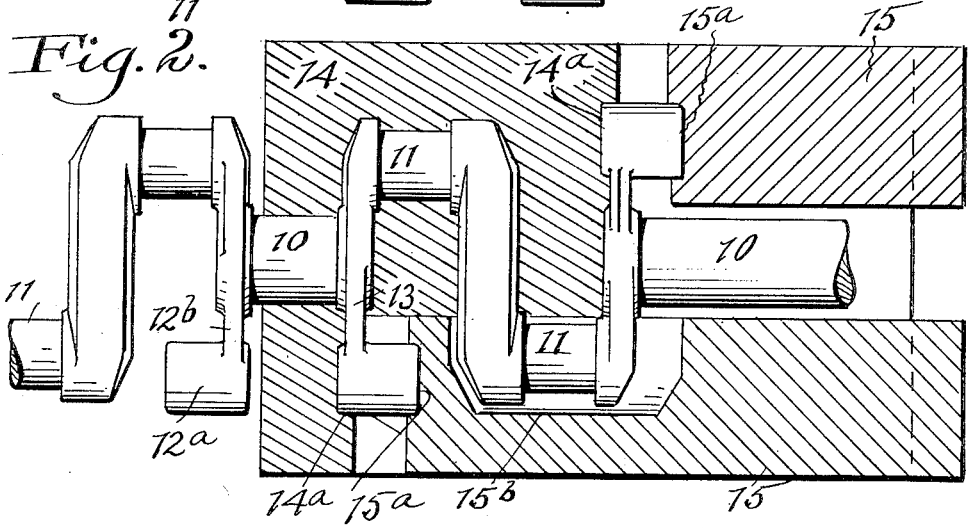
Figure 3:
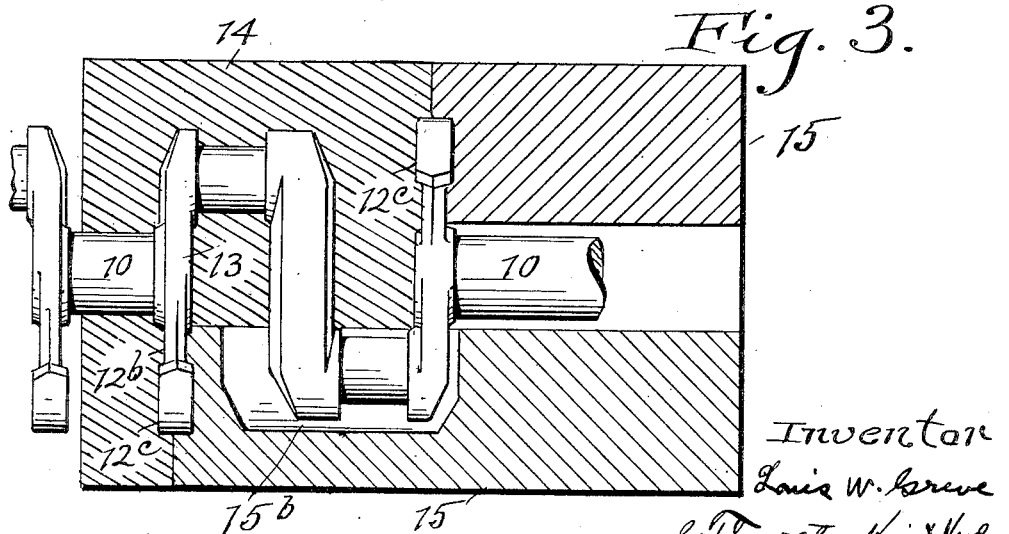

In the accompanying sheets of drawings showing the main steps of producing the crank shaft by this improved method, and showing dies which may be utilized to advantage in the re-forming and re-positioning of the counterweight masses, Fig. 1 is a side view of the crank shaft as produced by the forging dies employed in the first step of the process, wherein the crank shaft with the integral counterweights is forged; Fig. 2 is a view showing in section, dies which may be utilized in the next step of the method wherein the counterweight masses are re-formed and re-positioned; Fig. 3 is a similar view of the same with the dies of Fig. 2 closed; Fig. 4 is an end view of the dies showing the crank shaft in section; Figs. 5 and 6 are end views through the crank shaft before and after the counterweight masses have been re-formed and re-positioned by the second step of the process; and Fig. 7 is a side view of the completed crank shaft.

In the drawings I have shown a four-throw three-bearing crank shaft, but the invention may be utilized equally well with crank shafts having a different number of bearing portions and any desired number of throws or crank pins, the particular crank shaft herein illustrated, being shown and described for convenience only.

In Fig. 1 I have shown a crank shaft as produced by the first main step of the method. This crank shaft has in this instance, (but not necessarily as above stated) three bearing portions 10, and four crank pin portions 11. Additionally this crank shaft has four counterweights or counterweight masses 12, opposite the off-center weights to be counterbalanced, and in this instance located opposite the arms or cheeks 13 between each bearing portion 10 and the adjacent crank pin 11, and on opposite sides of the axis of the crank shaft to that on which the associated cheeks or arms extend. These counterweights produced on the crank shaft in the first forging operation are preferably no thicker (in a lateral direction) than the crank shaft itself. In other words they are substantially within the confines of the upper and lower surfaces of the crank shaft when it is forged. On the other hand, these counterweights or counterweight masses 12 have lugs or body portions 12$^a$ elongated or thickened longitudinally of the crank shaft, these being connected by relatively thin neck portions 12$^b$ to the crank shaft. Preferably the body portion or boss 12$^a$ of each counterweight projects chiefly in one direction from its associated neck portion, and to facilitate the upsetting of these bosses so as to expand the metal laterally, I prefer that in a four-throw crank shaft as herein illustrated, the bosses or body portions of two of the counterweights project from the neck portions 12$^b$ in one direction, or toward one end of the crank shaft, and the other two project in the opposite direction, this being done to permit the upsetting of two counterweights at one time, if that procedure should be desired.

In the next or subsequent step of the method the bosses or axially thick body portions of the counterweights are upset, and the metal is caused to flow laterally in suitable dies having forming depressions such as to give the counterweights, or the outer portions thereof, the desired sector-shape illustrated in Figs. 6 and 7 and designated 12$^c$ with the sector-shaped portions extending now laterally beyond the confines of the crank shaft, and to lie in planes transverse to the axis of the crank shaft as is desired.

This may be done in various ways and by various kinds of upsetting dies. The dies illustrated in the drawings include gripping members 14 which are designed to envelop and to tightly grip the crank shaft, in this instance for about one-half the length thereof, and the dies include also, movable sections 15, which when actuated under suitable pressure re-forms or re-positions the metal of the bosses or body portions 12$^a$, as above explained, and causes the metal of the bosses to assume the desired shape and location by causing it to flow and completely fill the forming depressions 14$^a$ and 15$^a$ in the gripping and movable sections of the dies.

With the upsetting dies herein illustrated, the bosses 12$^a$ of the two counterweights are simultaneously upset as before stated, this being made possible by recessing at the point 15$^b$ the two halves of the lower movable die section 15, illustrated in Fig. 2, so as to provide clearance to enable the inner of the two counterweights to be upset. If the counterweights are upset in pairs, with dies such as shown, or otherwise formed if desired, as soon as one pair of counterweights is upset, the crank shaft is reversed in the dies so that the other pair may be upset.

However, it is to be understood that the counterweights may be upset individually, or one at a time instead of in pairs as herein illustrated, and by any suitable form of dies.

It will be understood that this second step of the method, wherein the counterweights are upset so as to re-position and re-form the metal, is conducted immediately after the forging of the crank shaft in the first step of the method, and while the metal is still hot and capable of being caused to flow in the forming depressions of the dies utilized in the second step of the method, but, of course, the crank shaft may be reheated for this purpose if necessary or desirable.

Thus by this method there is produced a crank shaft wherein the counterweights are formed integral with the body of the crank shaft, and I am enabled to avoid the expensive operations of subsequently attaching the counterweights, and at the same time I produce a crank shaft wherein the off-center weights are as perfectly counterbalanced as possible, and wherein there is total absence of liability of the counterweight being thrown by centrifugal force from the crank shaft. At the same time by this method a crank shaft can be produced at a reasonably low cost.

I aim in my claims to cover all modifications of the method herein disclosed, which do not involve a departure from the spirit and scope of the invention as defined in the appended claims.

Having described my invention, I claim:

1. The method of making counterbalanced crank shafts which consists in forging the shaft with integral counterweights thereon, and subsequently causing the metal to flow laterally so that the counterweights will be extended laterally a greater distance than when forged.

2. The method of making counterbalanced crank shafts which consists in forging the crank shaft with integral counterweights thereon, subsequently decreasing the thickness of the counterweight masses axially of the counter shaft, and spreading or extending them laterally of the crank shaft.

3. The method of making counterbalanced crank shafts which comprises forging the crank shaft with integral counterweights thereon, and upsetting the counterweight masses so as to spread them laterally.

4. The method of making counterbalanced crank shafts which consists in forging the crank shaft with integral counterweights thereon, and subsequently changing the shape of the counterweights to cause them to be extended laterally a greater distance than when forged.

In testimony whereof, I hereunto affix my signature.

LOUIS W. GREVE.